Sept. 8, 1964  E. B. RONDEAU ETAL  3,148,315
METALLIZED THIN FILM CAPACITOR
Filed Nov. 3, 1959

ERNEST B. RONDEAU
LEONARD ADELSON
WALTER C. LAMPHIER
*INVENTORS*

BY *Connolly and Hutz*

THEIR ATTORNEYS

United States Patent Office 3,148,315
Patented Sept. 8, 1964

3,148,315
METALLIZED THIN FILM CAPACITOR
Ernest B. Rondeau, North Adams, and Leonard Adelson and Walter C. Lamphier, Williamstown, Mass., assignors to Sprague Electric Company, North Adams, Mass., a corporation of Massachusetts
Filed Nov. 3, 1959, Ser. No. 850,623
6 Claims. (Cl. 317—258)

This invention relates to electrostatic capacitors and more particularly to a composite electrode and dielectric in a thin structure for an electrostatic capacitor.

Metallized electrodes in convolutely wound capacitors provide a compactness of the wound capacitor structure so that a unit of standard capacitance and operating characteristics can fit into a minimum of space according to requirements. Further, capacitance is enhanced by a thinness of dielectric between electrodes.

The metallized electrodes must be suitably separated by dielectric material. At the same time, the composite dielectric and the metallized electrode on the dielectric material is preferably most effectively handled if it does not result in physical rupture or other injury which may later lead to electrical failure of the capacitor unit. Moreover, the metallized electrode should have the best healing properties that may be provided. It is well known that a particular advantage of capacitors made with metallized electrodes is the healing provided by this type of construction. This function of self-healing results from a "burning away" of the electrode metal from the immediate area of a break or defect in the dielectric spacer material. This burning away causes a discontinuity of electrical conduction and cuts off any electrical short circuit at the dielectric flaw, thus "healing" the capacitor.

Another attribute of an electrostatic capacitor is its ability to clear and reach a satisfactory insulation resistance. After the winding of the composite metallized electrode and dielectric into a rolled capacitor, the product capacitor is prepared for use by clearing.

It is an object of this invention to provide a metallized film in a convolutely wound capacitor with good insulation resistance properties in a unit that is as small as possible.

It is another object of this invention to provide a convolutely wound capacitor having metallized electrodes on a dielectric spacer which combines the properties of porous and smooth film spacers.

It is still another object of this invention to provide a convolutely wound capacitor having a composite electrode dielectric structure which provides a very thin dielectric separating the capacitor electrodes.

Figure 1:
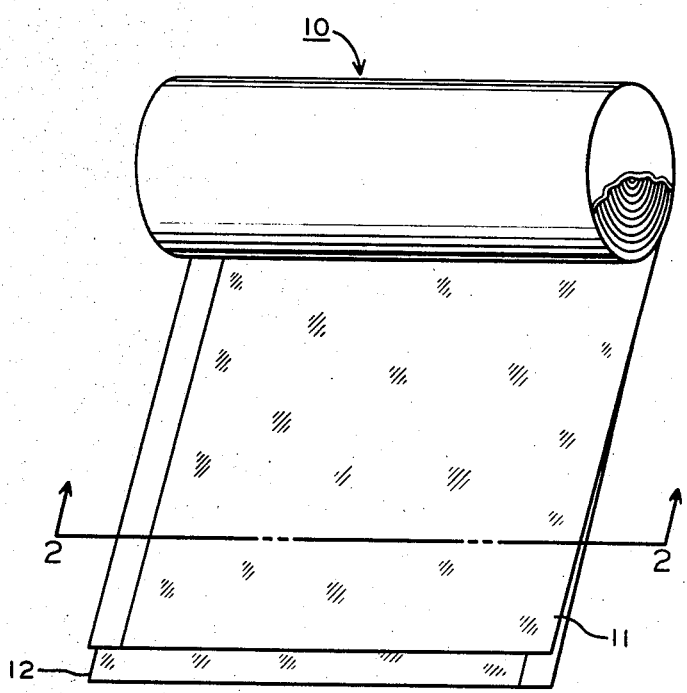
Figure 2:
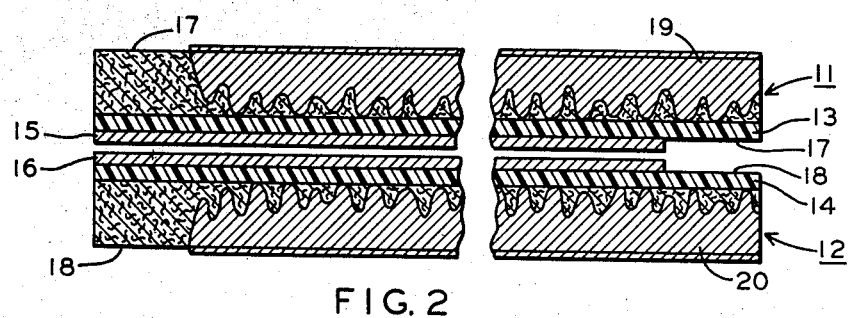

These and other objects of this invention will become more apparent upon consideration of the following description of its exemplifications together with reference to the accompanying drawings in which:

FIGURE 1 is a perspective view of a partially unrolled capacitance section showing the impregnated supporting base and the metallized strata supported on the supporting base according to this invention, and FIGURE 2 is a greatly enlarged schematic sectional view of the successive layers of FIGURE 1 and showing the composite makeup of the layers in the capacitor of this invention.

According to this invention there is provided a rolled capacitor having a composite in which a porous dielectric spacer with a thin resin film carries a metallized surface on the thin resin film and another metallization on the reverse side of the spacer. This composite structure is convolutely wound with another composite in which a similar dielectric spacer is similarly coated and metallized. The two composites are interwound so that the metallized surfaces which are on the thin resin films are in contact with each other to form one electrode of the convolutely wound capacitor. The thin resin film on the dielectric spacer is produced by the application of a lacquer to one surface of a sheet of a suitable porous spacer. The lacquer coats only the one surface of the porous spacer and leaves the other surface of the spacer pervious to receive a metallization which penetrates this unlacquered surface of the spacer.

This invention provides a metallized electrode type of capacitor having a lacquer-coated porous spacer in which the penetration of one of the metallized electrodes into the reverse surface of the porous spacer reduces the thickness of the effective dielectric to a dimension only slightly greater than the thickness of the lacquer coat. The composite structure is provided with bulk by the material of the porous spacer so as to insure body to the composite which is made up of the thin film, the spacer material, and the metallized electrodes. The metallized electrode on the smooth surface of the film preserves the self-healing characteristics of the metallized electrode capacitors. The composite structure features a complex dielectric system together with metallizations on this complex dielectric.

In a preferred embodiment of this invention the capacitor comprised of composite structures with complex dielectrics is fully impregnated with a suitable impregnant. The impregnant soaks into the porous spacer at the unlacquered surface.

The resin or lacquer film is applied to one surface of the porous spacer to provide a smooth base for the deposition of a metal layer thereon. The lacquer resins which may be suitably positioned on the surface of the porous spacer are represented by and include cellulose acetate, cellulose acetate sorbate, cellulose acetate butyrate, and cellulose nitrate.

Referring to the drawing, FIGURE 1 shows a capacitance section 10 in partially unrolled perspective to illustrate the successive convolute windings of dielectric spacers 11 and 12 which make up section 10. As shown in FIGURE 2, each of the pair of dielectric spacers 11 and 12 has a respective resin film 13 and 14 on one surface. The exposed surface of each of films 13 and 14 is suitably metallized with respective metallized layers 15 and 16. The right marginal strip of the films 13 and 14, as shown in FIGURE 1 and FIGURE 2, are bare of metallizations 15 and 16 respectively. Unmetallized marginal strips 17 and 18 are created by masking the surface of the resin film during metallization to prevent metallization of these margin areas and to form the marginal strips 17 and 18. The section 10 may be rolled to bring the metallized electrodes 15 and 16 into contact to form a common electrode as shown in the figures.

The resin film of this invention is coated on only one side of its respective spacer. Each of the spacers 11 and 12 is also provided with an additional metallized layer 19 and 20 respectively on the reverse side. The illustrated assembled construction, therefore, is made up of eight layers. As seen in FIGURE 2, the top layer is metallized layer 19 which is interspersed by metallization into the spacer 11.

The layer 11 is coated with resin film 13, and metallized layer 15 extends over the surface of resin film 13 to be in contact with metallized layer 16. The metallized layer 16 is in turn superimposed on resin film 14 coated on the surface of spacer 12, which in turn is interspersed by lowermost metallized layer 20. It will be understood that the relative dimensions as shown in the drawings are for the purpose of illustration only and are not necessarily representative.

Metallized layers 15 and 16 are smooth by virtue of deposition on respective smooth resin films 13 and 14. The smoothness of these respective surfaces facilitates the effectiveness of the "clearing" and "healing" action of the finished capacitor, because the metal can evaporate back cleanly from any short. Thus the preferred embodiment of this invention attains small size, plus excellent insulation resistance because of complete healing. It should be understood that for applications where insulation resistance is secondary, the size advantage offered by this invention can be attained while offering a lesser degree of healing action by rolling a smooth metal layer (15 or 16) against a rough metal layer (19 or 20).

The metallized layers 19 and 20 penetrate into respective porous spacers 11 and 12 so as to approach respective resin films 13 and 14 to leave very thin active dielectrics, e.g., spacer 11 with lacquer film 13 separate metallized layer 19 from metallized layer 15 by substantially less than the thickness of dielectric spacer 11. The active dielectric between the electrodes 15 and 19 is substantially only resin film 13. The spacer 11, however, acts as a physical support for film 13 and layers 15 and 19. The spacer 11 is also an adsorbent for the impregnant which is introduced into capacitor section 10 after the layers are rolled.

An embodiment of this invention is set forth in the following example which is presented for the purpose of illustration only and is not intended to be limitative.

*Example*

A capacitor having a double metallized paper construction was prepared as a rolled capacitor and tested. Two double metallized paper composites were convolutely wound to form the rolled capacitor. Each composite was made up of an uncalendered kraft paper porous spacer which was lacquered on one side and metallized on the lacquer coat and on the reverse side. A strip of kraft paper having a width of 1 13/16 inches and a thickness of 0.20 mil was lacquered on one surface with a resin film of cellulose acetate-sorbate by coating a mixture of cellulose acetate-sorbate and N,N'-methylbisacrylamide and heating the coated paper over night to produce a resin film. Zinc metal was thereafter vapor deposited in a vacuum metallizing apparatus on the coated paper to produce a composite of metallized electrodes and complex dielectric. Margins were produced on the resin film by masking the marginal strip during the metallization. The metallization has no thickness dimension measurable for production test purposes. The prepared composite had a thickness of slightly less than a ¼ mil.

Two composites of 1 13/16 inches width each were interwound in 300 turns on a ⅛ inch mandrel having 297 capacitive turns. The rolled section was suitably impregnated with Bareco wax, a natural mineral wax, stabilized with azobenzene. Terminal leads were contacted against the respective electrode layers by the means of a solder spray applied to the respective metallized margins of the metallized layers present at the respective ends.

The resultant capacitor was cleared after impregnation through a resistor at 150 volts. The capacitor had an insulation resistance of 4,500 megohms and a capacity of 4.05 microfarads with a power factor of .7%.

As a result of the composite construction of this invention, a dielectric is provided in approximately the thickness of the lacquer film on a porous spacer and at the same time there is maintained the strength and the convenience of the porous spacer as a support for the metallized layers. Among other advantages of this construction is the reduced physical size in relation to the obtained dielectric properties. This construction provides a very thin actual dielectric while providing a substantial support of a dielectric substance for the active dielectric and the metallized layer. The layer of film thus mounted on a porous supporter which is covered by a metallization provides a smooth surface which assists clearing at the surface in the product capacitor. The good clearing properties insure satisfactory capacitance and insulation resistance within the finished capacitor.

As described above kraft paper is the preferred porous spacer in the system of this invention. Nevertheless, numerous other porous dielectric spacers can be used including linen paper, both calendered and super-calendered kraft paper, fiber glass woven and pulped in the form of a cloth or a matte-like spacer, cross-linked nylon of both the woven and non-woven variety and other porous dielectric spacers and combinations of these above spacers. The metallized layers can be applied by metal spraying, evaporation, sputtering and other established techniques of any desired metal preferably zinc or aluminum. It is preferable to use the metallizing technique known to be applicable to the resin film.

The kraft paper porous spacer of the preferred embodiment is coated with a lacquer film and metallized on its reverse surface with a metal layer and is also suitably impregnated to fill the remaining voids within the porous structure. Thus, the most advantageous structure possible is obtained. This structure provides a thin dielectric on a flexible substantial support and is also free from voids as a result of an impregnation with liquid dielectric. The smooth surface of the film provides an ideal base for receiving a metallized layer. This film-based metallized layer in turn is advantageous in its superior characteristics in the wound capacitor.

The above-described preferred embodiment is set forth for the purpose of illustration only. It will be readily understood that the description herein is for the purpose of illustration and that the scope of the invention is limited only by the appended claims.

What is claimed is:

1. A capacitor having a layer of porous dielectric material, a resin dielectric film on one surface of said layer, a first metal coating on said film, a second metal coating on the other surface of said layer and having substantial penetration into said layer, whereby the active dielectric between said first metal coating and said second metal coating is said film plus the unpenetrated portion of said layer.

2. A capacitor having a metallized stratum of dielectric material convolutely wound with another conductive layer, a resin film on one surface of said stratum, a smooth metallized surface on the resin film so constructed and arranged that the convolutely wound metallized surface of said stratum is in close physical contact with the conductive layer, the conductive layer and the metallized surface of said stratum being convolutely wound together, a second metallized surface on the other surface of the stratum having substantial peneration into said stratum, and separated from the first metallized surface mainly by the resin film.

3. A capacitor having a pair of layers of dielectric material convolutely wound with each other, resin films on one surface of each of said layers, metallized surfaces on said respective resin films, said metallized surfaces being in contact in said convolutely wound capacitor, and second metallized surfaces on each of the respective reverse sides of said layers and having substantial penetration into said layers, whereby the active dielectric is substantially less than the thickness of said layers.

4. A capacitor comprising a composite electrode structure, said structure being a porous member of dielectric material with a resin dielectric film on one surface and a first metal film on said resin film and a second metal film on the other surface, said first and said second metal films being electrically isolated from one another, said second metal film having substantial penetration into said porous member whereby the active dielectric between said first and said second metal films is substantially less than the thickness of said porous member.

5. A capacitor comprising a composite electrode structure, said structure consisting of a porous ribbon member of dielectric material having a metal coating on the two opposed flat surfaces, a resin dielectric coating under the metal film on only one of the surfaces, the metal coatings being in electrical isolation, the metal coating on the surface opposed to the resin film having substantial penetration into said porous ribbon member, whereby the active dielectric between said metal coatings is substantially less than the thickness of said porous ribbon member.

6. A capacitor comprising a convolute winding of an even number of composite electrode members, each of said electrode members being a porous sheet of dielectric material metallized on its opposed surfaces and with a resin dielectric film under the metal film on only one surface, the metal films being in electrical isolation from one another, the metallization on the surface opposite said resin film having substantial penetration into said porous sheet, whereby the active dielectric between the metallizations is substantially less than the thickness of said porous sheet, said convolute winding so arranged that the metal films which overlie the resin films are in electrical contact.

References Cited in the file of this patent
UNITED STATES PATENTS

| | | |
|---|---|---|
| 2,367,152 | Strab | Jan. 9, 1945 |
| 2,470,826 | McMahon | May 24, 1949 |
| 2,593,829 | Arledter | Apr. 22, 1952 |
| 2,887,649 | Peck | May 19, 1959 |
| 2,919,390 | Robinson | Dec. 29, 1959 |
| 2,935,668 | Robinson | May 3, 1960 |
| 2,938,153 | Netherwood | May 24, 1960 |

FOREIGN PATENTS

| | | |
|---|---|---|
| 1,059,541 | France | Nov. 10, 1953 |